Figure 1:
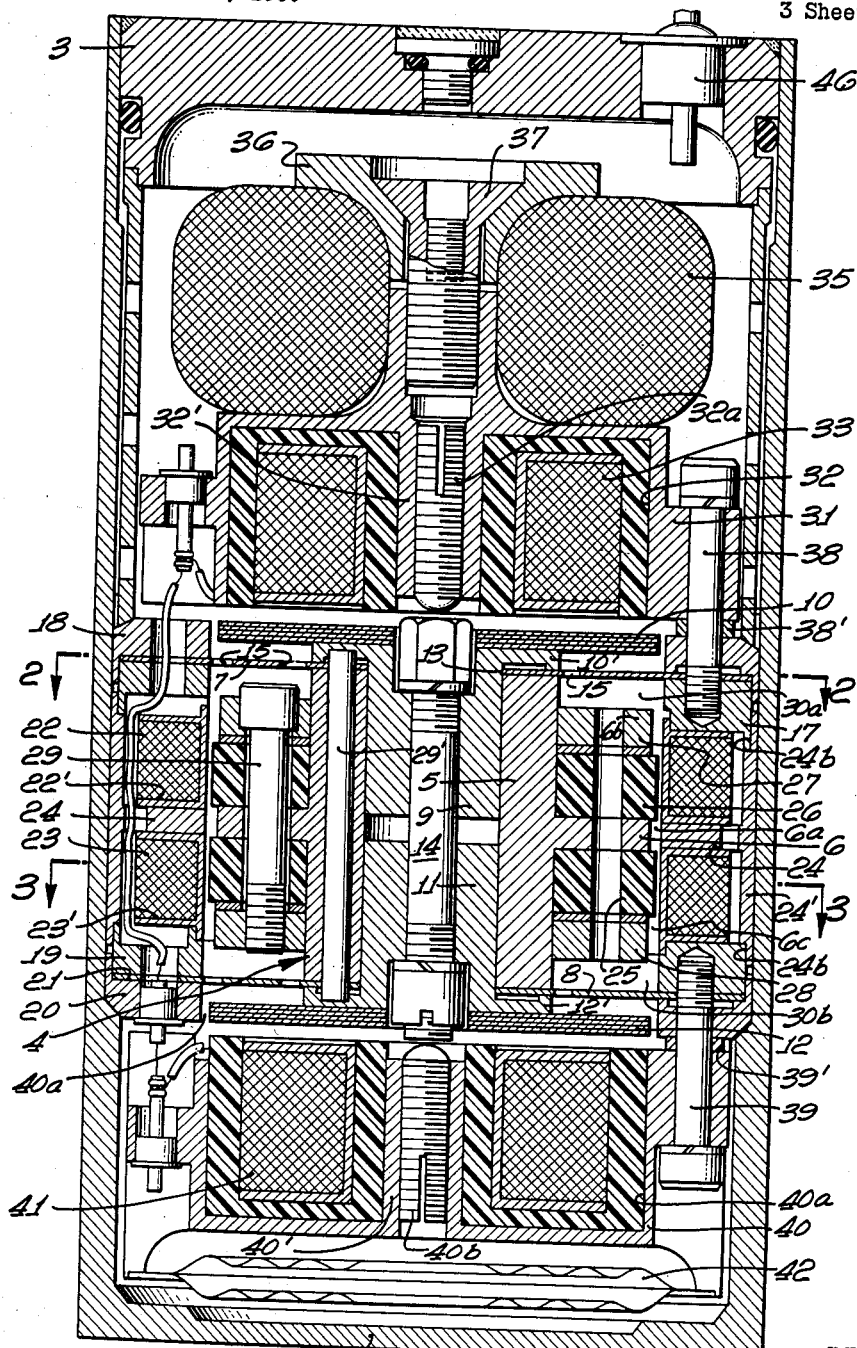

Feb. 5, 1963

R. E. DUMAS ETAL 3,076,927

ELECTRICAL BRIDGE CIRCUITS

Filed Feb. 5, 1960

3 Sheets-Sheet 1

INVENTORS.
ROGER E. DUMAS
ARTHUR C. HUGHES
BY

ATTORNEY.

Feb. 5, 1963  R. E. DUMAS ETAL  3,076,927
ELECTRICAL BRIDGE CIRCUITS
Filed Feb. 5, 1960  3 Sheets-Sheet 2

INVENTORS
ROGER E. DUMAS
ARTHUR C. HUGHES
BY

ATTORNEY.

Feb. 5, 1963  R. E. DUMAS ETAL  3,076,927
ELECTRICAL BRIDGE CIRCUITS
Filed Feb. 5, 1960  3 Sheets-Sheet 3

INVENTORS.
ROGER E. DUMAS
ARTHUR C. HUGHES
BY

ATTORNEY.

United States Patent Office 3,076,927
Patented Feb. 5, 1963

3,076,927
ELECTRICAL BRIDGE CIRCUITS
Roger E. Dumas, Pacific Palisades, and Arthur C. Hughes, Santa Monica, Calif., assignors to Statham Instruments, Inc., Los Angeles, Calif., a corporation of California
Filed Feb. 5, 1960, Ser. No. 6,916
6 Claims. (Cl. 323—75)

This invention relates to electrical bridge circuits such as may be employed with electromagnetic transducers of the electromagnetic type in which the inductance of a coil positioned in the bridge circuit is varied to vary the balance of the bridge to produce an output which is proportional to the change in inductance. It is particularly applied to fully inductive bridges in which the balancing impedances are inductive in character. It is particularly adapted to inductive bridge circuits of the 4-arm design in which there are at least two arms which are active arms, i.e., in which there are two coils whose inductances are varied in an opposite direction, i.e., one increased, the other decreased to unbalance the bridge.

These inductances are designed to be symmetrical in character, i.e., to be substantially of equal inductance and to be equally varied in opposite directions. Each of said inductances is energized by the secondary of a transformer whose primary is inductively coupled with each of said inductances, through the secondary windings of said transformer.

In such circuits it is difficult to establish a balance between the active arms and to balance inactive arms, i.e., inductances of fixed value, because it is difficult to establish not only the equal inductances but equal resistances and distribute capacities of the various coils of the bridge. The impedances of each of said arms may, therefore, because of the difficulty to establish the exact value of the impedance, result in an unbalance.

This unbalance may be termed a quadrature unbalance, because of the phase relations between each of the coils and the phase of the charging potential on the primary. It is one of the objects of our invention to correct for such quadrature unbalance by introducing resistances between the active arms and the inactive arms which correct for the relationships between the resistances of the coils, so that there may be a phase balance between the coils and the input. Notwithstanding such balance, physical construction variations due to inaccuracies in manufacturing procedures or strains introduced into the mechanical construction of the bridge may introduce a further inequality in the impedances of the bridge, so that even when balanced by the added resistances for correction of quadrature unbalance, still results in some residual unbalance of the bridge.

This unbalance may be further corrected by a vernier bridge composed of a pair of inductances which form a second set of secondaries inductively coupled with the primary and a pair of balancing resistances. Because of the use of balancing resistances, the phase relationships in the second set of secondaries are maintained in phase with the voltage in the primary and thus in phase with the output from the first bridge.

As a result of this construction, we may obtain an accurate balance of the bridge circuits and correct for both electrical unbalance and mechanical unbalance resulting from accidental and inherent inequalities in the arms of the bridge. It is therefore an object of our invention to develop a bridge circuit suitable for use with electromagnetic transducers in which any unbalance due to quadrature effects and mechanical asymmetry may be corrected and an accurate balance of the bridges obtained when the system is in balanced condition.

In the following specification, we have illustrated the application of this bridge to a particular electromagnetic transducer for purposes of illustration, but those skilled in the art will understand that such bridge circuits are of general utility and applicability to any type of bridge circuits in which one or more than one active inductive arms are employed.

This invention will be further described by reference to the drawings of which

Figure 2:
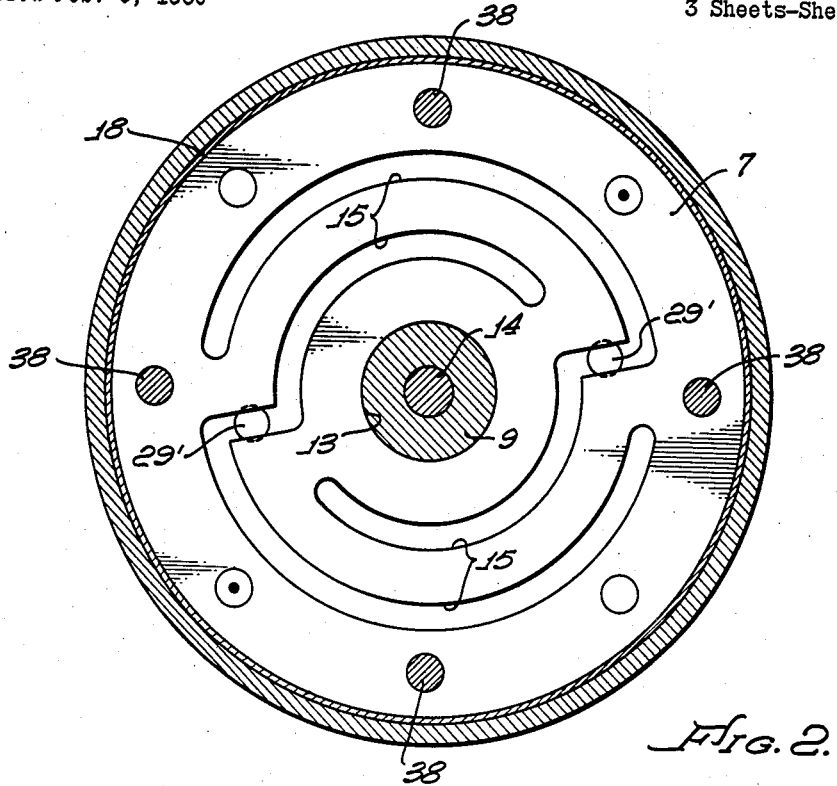
Figure 6:
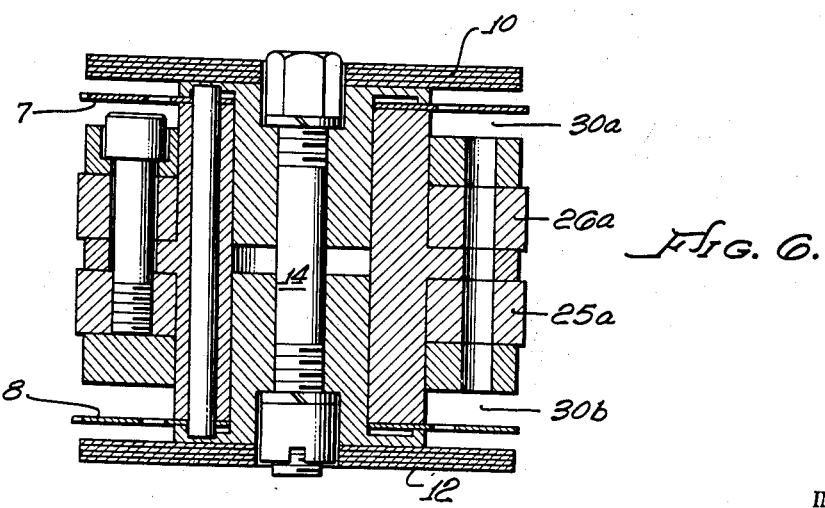
Figure 3:
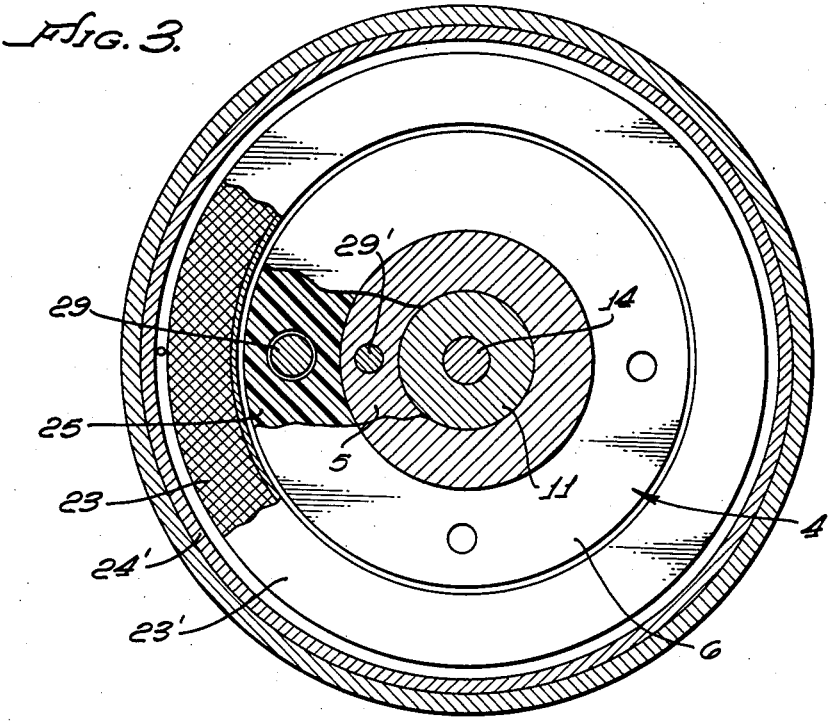
Figure 4:
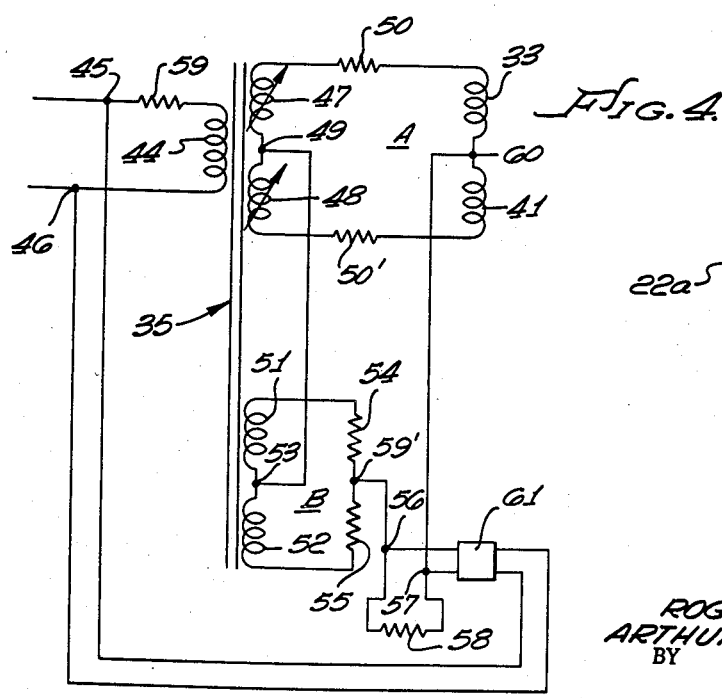
Figure 5:
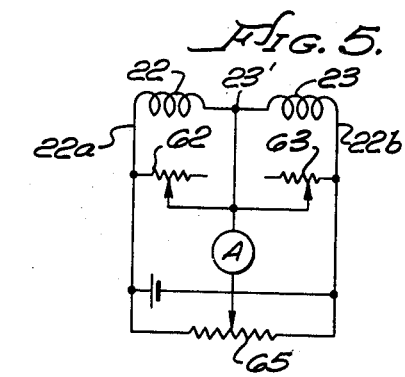

FIG. 1 is a vertical section through a transducer employing a preferred form of our invention;
FIG. 2 is a section on line 2—2 of FIG. 1;
FIG. 3 on line 3—3 of FIG. 1;
FIG. 4 is a schematic circuit diagram of the electromagnet sensing element;
FIG. 5 is a schematic circuit diagram of the force coil system; and
FIG. 6 is a modification of the mass assembly employed in FIGS. 1–5.

The transducer illustrated in FIG. 1 consists of a casing having a bottom 2 and a cover 3. The mass assembly 4 is formed of an armature plate 10 positioned on a grooved flange 10′ which is carried in the internal bore of sleeve 5 in which the stem 9 is positioned. The flat spring 7 carrying arcuate slots 15 and a central bore 13 is clamped between the flange 10′ and an end of the sleeve 5. Central flange 6 on sleeve 5 carries the rings 27, 26, 25 and 28 by means of cap screw 29. The lower end of the sleeve 5 carries a stem 11 with a grooved flange 12′, similar to 9 and 10′. The orientation of the stems 9 and 11 and sleeve 5 is fixed by locating pin 29′ which passes through bores in the stem 5, springs 7 and 8 and seats in receiving sockets in the flanges 10′ and 12′. The spring 8 of construction similar to spring 7 is clamped between the end of 5 and the flange 12′.

The laminated armature 10 is carried on the flange 10′ on stem 9, and the laminated armature 12 is carried on the flange 12′ of stem 11. The circular plate armatures 10 and 12 are composed of laminated sheets of metal, each of which is surface oxidized and formed of metal of high magnetic permeability and of laminated construction and metal similar to that used in transformer cores. The metal of 5, 6 and rings 28 and 27 is of high magnetic permeability and low coercive force. The flange 10′, stem 9, spring 7, bolt 4, stem 11, flange 12′ and spring 8 are of low magnetic permeability. The rings 25 and 26 are made of plastic, e.g., polytetrafluoroethylene, sold by Du Pont de Nemours under the trademark Teflon, or poly monochlorodifluoroethylene sold under the trademark Kel–F, or any other moldable or machinable organic plastic material having a substantially different temperature coefficient of expansion.

The mass assembly is held in position by the bolt 14 through suitably provided bores in 9 and 11. A bore 30 may be provided through the rings 27, 26, 25 and 28 and the flange 6, holes being in registry to give a continuous passageway from the space 30a to 30b. This is desirable in order to introduce additional dynamic mass into the system if the system is filled with damping liquid as will be more fully described below.

The spring 8 is clamped at its outer edges between the ring 20, seated on the internal shoulder 21 and the ring 19 by means of the cap screws 39. The receiver 40 is formed with an annular groove 40a and a central boss 40′, carrying a screw 40b which acts as a stop for the mass 4. The electro-magnet coil 41 held in a receiver 40 is mounted on the ring 21 by means of spacers 39′ and the cap screws 39 which are threaded into the ring 19. There are a plurality of these cap screws spaced about the periphery of the unit.

The spring 7 is clamped between the ring 17 and the ring 18 by means of cap screws 38. The electro-magnet coil 33 is mounted in the receiver 31 which is mounted on ring 18 by spacers 38' and held secure by cap screws 38 which are threaded into the ring 17. There are a plurality of said screws positioned around the periphery of the unit.

24 is a flange integral with the sleeve 24', in which the rings 17 and 19 are inserted. The sleeve 24' has step 24b to maintain spacing between rings 17 and 19.

The sleeve 24', concentric with the sleeve 5 and flange 6 and spaced therefrom to provide an annulus, is clamped between the rings 19 and 17. The receiver 31 has an annular slot 32 and a central boss 32'. The coil 33 is set in the annular slot 32. The central boss 32' carries a screw 32a which acts as a stop for the mass 4. The armature 10' is spaced from the core 32' of the coil 33 and from the outer peripheral wall of the annular gap 32', and the armature 12 is spaced from the core 40' and the outer peripheral wall of the annular gap 40a by an air gap which is equal to the air gap for coil 33 when the mass 4 is positioned centrally between the two coils. The magnetic circuit for each of the coils is around the receiver through the core and the outer peripheral wall of the annular groove across the gap and across the armature. A variation in position of the mass will increase the length of the gap for one coil and decrease it for the other, depending upon the direction of motion. This variation in the length of the gap will affect the inductance of each of the coils essentially equally for motions that are a small part of the air gap, of under about ⅓ of the gap length, and in opposite directions.

The insulated solenoid force coils 22 and 23 are positioned in circular channels 22' and 23' surrounding the mass 4 and clamped between the rings 17 and 19 and spaced apart by the flange 24 on the mounting sleeve 24'. The flange has a number of spaced bores 24a for passage of wiring. The spring clamping rings 18, 20 and ring channels 22' and 23' are of low permeability, i.e., of high reluctance material. For example, a reluctance equal to air and of high electrical resistivity to inhibit eddy currents. The ring flange 24 and sleeve 24', 17 and 19 are of high magnetic permeability, i.e., low reluctance and low coercive force.

The force coils 22 and 23, positioned in the annulus between 5 and 24', are connected in series as shown in FIG. 5 to terminals 22a and 22b and with a center tap terminal 23'. Each of these terminals is connected by conductors to the terminal connector 46. Carried on the receiver 31 is a toroidal coil transformer 35 held by clamp 36 by means of studs 37.

Positioned at the bottom of the transducer and held in position by the receiver 40 is a bellows 42 which is filled and sealed with ambient air at atmospheric pressure.

The transformer 35 is composed of an insulated primary 44 connected to a series resistance 59 and to the input terminals 45 and 46. One set of insulated secondary windings 47 and 48 is connected in series with a center tap 49, and a second set of secondaries is positioned in 35, composed of secondary coils 51 and 52 connected in series with a center tap 53 between coils 51 and 52 and cross connected to the center tap 49. Resistances 54 and 55 are connected in bridge arrangement (B) with the secondaries 52 and 53, and a resistance 50 is connected in series with the coil 47. Coils 33 and 41 are connected in a bridge A with secondary windings 47 and 48 through the resistances 50 and 50'; and the center tap 59, between resistances 54 and 55, is connected to the terminal 56 and the center tap 60 between coils 33 and 34 connected to the terminals 57. The coils 44, 47, 48, 51 and 52 are positioned at 35. The resistances are positioned about the periphery of the housing 31. The input terminals 45 and 46 and the output terminals 56 and 57 are connected to the terminal outlet connector 46.

The instrument is assembled by inserting the mass assembly 4 and the frame assembly assembled with rings and coil means into the case and resting the entire assembly on the shoulder 21. The case is filled with a damping liquid, such as an electrically insulating, i.e., nonconductive, oil, siloxane oils such as sold as Silicone oils by Dow-Corning Chemical Company. Before inserting the unit into the system, the resistance 50 and resistances 54 and 55 are determined to provide a zero output at 56 and 57 upon the application of a design A.C. voltage at 45 and 46.

The bridge circuit and transformers are fully contained inside the container and are balanced and do not require external leads to balancing resistances and inductances. This avoids variations in reactance resulting from movement of leads.

The value of the resistance 50 or 50' is established to compensate for the quadrature unbalance of the secondaries 47, 48 and coils 33 and 41 in the bridge. An inductive bridge such as is composed of the inductances 47, 48, 33 and 41 is most difficult to balance unless the impedances be balanced both reactively and resistively; otherwise, the output may be out of phase with the input to the bridge. In order to avoid this result, symmetry is necessary. In the absence of such symmetry any inequality in capacitance and inductance in the legs of the bridge will introduce a shift in the phase relationship in the various legs of the bridge and an overall phase displacement at the output with respect to the input of the bridge. The circuit employed and shown in FIG. 4 avoids this difficulty. The inductances 33 and 41 are designed to balance as nearly as possible the inductances in the secondary circuit 47 and 48. The required resistance 50 is then determined experimentally to correct the quadrature unbalance of the bridge composed of 47, 48, 33 and 41. Normally, this would be sufficient to give a zero balance to the bridge. This balance is accomplished before installation of the coils in the unit.

When the coils are installed in the unit, the relationship of the coils 33 and 41 with respect to the mass may not produce a symmetrical arrangement of the coils and armature because of the variations in the spacers 38' and the degree of clamping. The presence of such asymmetry will produce a net output of the bridge due to the inequality in the air gap between the coils and the armatures, which makes the reluctance in the magnetic circuit of each of the coils 33 and 34 unequal. Since this output is in phase with the input, due to the balancing of the main bridge, the vernier bridge B composed of secondaries 51 and 52 and the resistances 54 and 55, may be powered from the same power source as bridge A and therefore may be coupled inductively with the primary 44 and therefore powered thereby.

The input to vernier bridge is then in phase with the input to the main bridge A and also in phase with the output of the main bridge A. The consequence of this arrangement is that the vernier bridge will balance out the output from the main bridge resulting from mechanical imperfections in the mounting or adjustment, and may be thus powered from a common source.

After mounting the unit and before final assembly thereof, the magnitude of resistances 54 and 55 are determined and the proper resistances introduced into position in the receiver 31 and the unit is then assembled.

It is to be noted that the resistances 50, 50', 54 and 55 may be made temperature sensitive to correct for variations of impedance in the legs of the bridges A and B resulting from any inequality in the temperature coefficient of the variation of inductance with temperature of the coils 33 and 41, or slight shifts in the zero position of the spring mass system due to residual mechanical strain in the mounting of the system.

When the resistance load, schematically indicated at 58, is placed across the output of the bridges, the ratio of the resistance to inductance of the main bridge A is changed as compared to zero load conditions. In order to keep the output of the main bridge in phase with the input to the primary, the ratio of the resistive to the reactive components of the impedance in the input circuit of the primary 44 is established to be substantially the same as in the bridge circuits with the load resistance in the circuit by adding a second resistance 59 in series with the primary 44.

An output of the bridge occurs when the mass 4 is displaced so as to cause one of the armatures to approach and the other to move away from its adjacent coil 33 or 41, as the case may be, resulting in a change in the impedance of the coil 33 and 41. This output may be measured by a read out device such as an oscillograph, illustrated in 61.

The force coils 22 and 23 are mounted with the poles so that the fields are opposed so that they add at the flanges 6 and 24, pass through 6 and 5 and return through sleeve 24' and rings 17 and 18 respectively and connected exteriorly of the unit, as shown in FIG. 5. The coils are each shunted by a variable resistor (see 62 and 63) and the potentiometer 65 may be adjusted. Thus by adjustment of 65, 63 and 62, a differential current measured by the ammeter A may pass through the coils. The resultant magnetic force may thus be exerted to displace the mass 4, which thus acts as the solenoid armature, in a direction depending on the direction of the differential current and on its magnitude.

The flux density at 23' remains substantially constant irrespective of any displacement of the mass 4, which thus acts as the armature for the differential solenoid including coils 22' and 23' which are inductively coupled with the sleeve 5. On displacement of the mass 4, in one direction the gaps 6a remain constant, while the gaps 6b and 6c, while remaining of constant length, are of variable area and vary in opposite directions. The net flux through the coils 22 and 23 and the mass 4 thus remains substantially constant independent of movement of the mass.

Referring to FIG. 5, the variable resistances 62 and 63 are adjusted to compensate for incidental differences in the gap dimensions, winding and leakage flux, to establish a net zero magnetic force on the mass 5 when the mass is at its zero, that is its undisplaced position. The consequence of this arrangement is that no net force is exerted on the mass 5 by the coils 22' and 23' when they are energized in the circuit shown on FIG. 5. With the circuit balanced as shown in FIG. 5, zero current will be indicated by the ammeter. It will be observed that the system is designed so that it is symmetrical about a midplane between the two coils 22 and 23, so that when the instrument is placed horizontally with the gravitational vector, perpendicular to the sensitive axis, i.e. the case and system, no differential current in the coil, no force is exerted on the mass 4 to displace the same. Any displacement from zero position would be indicated by an output at 56—57. The balance is checked by observing, as stated above, whether there is current flow through the ammeter A and an output at 56—57. The system is thus balanced inertially and magnetically.

If the instrument to be employed is in a vertical position, i.e. with the gravitational vector parallel to the sensitive axis of the instrument, the potentiometer 65 and the resistances 63 and 62 are adjusted to give a zero output at 56 and 57 at the bridge of FIG. 4 under this resultant gravitational acceleration. It will be noted that with the instrument vertical, the mass will be displaced downwardly due to gravitation and the coils 22 and 23 must be unbalanced to give a net contra-gravitational magnetic force equal to the force of acceleration due to gravity and thus reestablish the central position of the mass 4 between the coils 33 and 41 to give a zero output at 56—57. Where this is not desired, instead of employing the force coils to bring to a null balance, we may employ spacers 38' and 39' of unequal width to center the mass mechanically between the coils 33 and 41 under the influence of gravitational displacement. With either means for centering the mass against gravity, the mass is centrally positioned so that it is centered magnetically between the sensing coils 33 and 41 as described above, to give a zero output at 56—57.

By adjusting the potentiometer 65 to unbalance the coils 22 and 23, we may thus introduce a net magnetic force and measure the displacement of the mass by measuring the output at 56—57 as a result of this magnetic force. Since the mechanical force necessary to displace the mass is known and its variation with displacement also known, the mechanical force resulting from any unbalance of the bridge of FIG. 5, as shown by the reading of the ammeter A, is also known.

It will be observed that if the mass is displaced upwardly against gravity, the force necessary to give a unit displacement of the mass is greater than if the mass is displaced downwardly due to the fact that the gravitational vector is subtractive when the mass is moved upward and additive when the mass is moved downward.

In order to equalize and make linear the displacement of the mass irrespective of whether the mass moves upwardly or downwardly, i.e. with or against the gravitational vector and thus the reading on the ammeter A of FIG. 4 be a correct measurement of displacement irrespective of direction, the gaps 6a, 6b and 6c are made different. Thus the gap 6b in length is made smaller than the gap 6c and the gaps contoured so that the average length gap of 6b increases as the mass moves downward in the direction of the gravitational vector. This may be done by tapering downwardly the external surface of the gap 6c. What is desired is that the differential current for unit displacement of the mass upwardly be substantially equal to the differential current required for unit displacement downwardly. This is obtained in our system of this application in which a linear axial solenoid is provided in which the force on the armature is directly proportional to the differential current. The contouring of the gaps is designed to obtain magnetic stiffness, such that when added to the mechanical spring acting on the inertial mass, will produce a net force displacement relationship which will be linear and independent of the direction of motion.

In order to avoid the interaction of the magnetic fields of the coils 33 and 41 with the magnetic field of the solenoid coils 22 and 23, which otherwise would introduce greater complications in design, we provide for the substantial isolation of these two fields. This isolation results from the low-magnetic permeability characteristics of the spring 7 and 8, the oxidized surfaces of the laminated armature 10 and 12, the flanges 10' and 12', the spacers 38' and 39, and rings 16 and 20, all of low permeability as described above. Furthermore, by making the face of 27 and 28 large in area while the gaps 6b and 6c are made small in length, a low flux density is obtained in the small length gap and the leakage flux is thus substantially reduced to very small values.

The polarities of the A.C. fields of the coils 33 and 41 are made to vary in phase so that any residual leakage field will affect the A.C. permeability of the magnetic circuit of the coils 33 and 41 identically. The A.C. field is made from about 10 to 100 times the mechanical natural frequency of the suspended mass 4 so that the coils 33 and 41 see at any instant of time a sensibly constant mass position with respect to each coil, which will be irrespective of the oscillation of the mass.

As a consequence, the null position of the system will not be influenced in any material respect by the magnetic leakage fields from the force coils. The displacement of the mass occurring in use is small, so that the variation in reluctance of the magnetic circuit associated with the force coil is of the order of ⅓ or less, e.g. 15–20% of the total reluctance in all the gaps including the gap 6a.

FIG. 6 shows a modification of the mass assembly employed in the unit, whereby an eddy current damping force may be introduced into the system. Where the system in FIGS. 1-5 is filled with damping fluid, such as a silicone oil, the damping force may be the result of shear forces attained by relative movement of the mass in the gaps and also by the relative movement of the liquid in the passageway 30. We may, in addition to using liquid as a damping force or in the place of using liquid, employ an electromagnetic damping force by replacing the plastic of rings 25 and 26 by electrically conductive material such as copper or aluminum, or other metal used in eddy current brakes (metal rings 26a and 25a) and by connecting the coils 23 and 22 so that the currents and the resultant mechanical force of the coils buck each other and cancel each other out. The current flowing in the coils will induce eddy iurrents in the ropper rings and introduce a magnetic force which will oppose the motion of the mass caused by the oscillation of the mass. Due to the nature of the eddy currents, the magnitude of these currents and the braking action resulting from the electromagnetic forces thus developed are proportional to velocity and therefore have the effect of a damping force.

By controlling the magnitude of the current through the coils 22 and 23, we may control the magnitude of this damping force and therefore obtain any desired degree of damping.

While we have described a particular embodiment of our invention for the purpose of illustration, it should be understood that various modifications and adaptations thereof may be made within the spirit of the invention as set forth in the appended claims.

We claim:

1. An electrical bridge including a pair of electromagnetic coils in series, means to vary the inductance of said coils, and a pair of balancing coils connected in series, a resistance connected to each of said balancing coils and to said first mentioned coils, a primary coil inductively coupled with said first mentioned coils, a center tap between said first mentioned coils, a second center tap between said balancing coils and connected to an output terminal for said bridge, a second bridge comprising two coils in series inductively coupled with said primary, the center tap between said coils of said second bridge electrically connected to the first mentioned center tap, a pair of balancing resistances connected in series and connected to said coils of said second bridge, a center tap connected between said resistances and connected to another output terminal of said bridge.

2. In the bridge of claim 1, a resistance in series with each of said first mentioned coils and a resistance in series with each of said second mentioned coils.

3. In the bridge of claim 2, said resistances being temperature sensitive resistances.

4. In the bridge of claim 1, said primary connected to power input terminals, a resistance in series with said primary, a resistance in series with one of said output terminals.

5. In the bridge of claim 4, a resistance in series with each of said first mentioned electromagnetic coils and with each of said second mentioned coils.

6. In the bridge of claim 1, a temperature sensitive resistance in series with each of said first mentioned coils and a temperature sensitive resistance in series with each of said second mentioned coils, a resistance in series with said primary, power input terminals for said resistance and primary, a resistance in series with one of said output terminals.

No references cited.